United States Patent
Gass et al.

(10) Patent No.: US 7,114,899 B2
(45) Date of Patent: Oct. 3, 2006

(54) POP-UP FASTENER

(76) Inventors: Richard Christopher Gass, 38070 Ed Brown Rd., Colton's Point, MD (US) 20626; Robert Neil Dombroski, 197 Celia Dr., Waterbury, CT (US) 06705; Ralph Carpinella, 725 Breakneck Hill Rd., Middlebury, CT (US) 06762

( * ) Notice: Subject to any disclaimer, the term of this patent is extended or adjusted under 35 U.S.C. 154(b) by 0 days.

(21) Appl. No.: 10/761,360

(22) Filed: Jan. 22, 2004

(65) Prior Publication Data

US 2005/0163588 A1  Jul. 28, 2005

(51) Int. Cl.
  F16B 39/00  (2006.01)
  F16B 21/18  (2006.01)
  F16B 19/00  (2006.01)

(52) U.S. Cl. .............. 411/107; 411/999; 411/516; 411/508; 411/509; 411/510; 411/913; 411/552

(58) Field of Classification Search ............ 411/107, 411/999, 552, 516, 520, 521, 508–510, 913; 29/432.1
See application file for complete search history.

(56) References Cited

U.S. PATENT DOCUMENTS

| | | | |
|---|---|---|---|
| 2,007,179 A | | 7/1935 | Bullis |
| 3,343,581 A | * | 9/1967 | Martin et al. ............... 411/349 |
| 3,346,032 A | * | 10/1967 | Gulistan .................... 411/349 |
| 4,315,361 A | * | 2/1982 | Brooks ....................... 29/432.1 |
| 4,720,223 A | * | 1/1988 | Neights et al. ............... 411/11 |
| 4,810,144 A | * | 3/1989 | Martelli ....................... 411/182 |
| 5,743,670 A | * | 4/1998 | Ader .......................... 403/296 |
| 6,022,009 A | * | 2/2000 | Hill ............................. 269/47 |
| 6,227,785 B1 | * | 5/2001 | Kilgore ..................... 411/526 |
| 6,296,431 B1 | | 10/2001 | Miller |
| 6,679,666 B1 | * | 1/2004 | Mizuno et al. ............. 411/353 |
| D496,852 S | * | 10/2004 | Gass et al. .................. D8/387 |
| 2001/0024607 A1 | * | 9/2001 | Frattarola ................... 411/107 |
| 2002/0197134 A1 | * | 12/2002 | Huber ........................ 411/551 |
| 2003/0127146 A1 | | 7/2003 | Siiter |
| 2003/0156923 A1 | * | 8/2003 | Winkler et al. ............. 411/552 |
| 2003/0175091 A1 | * | 9/2003 | Aukzemas et al. ......... 411/107 |

FOREIGN PATENT DOCUMENTS

| | | |
|---|---|---|
| FR | 2691765 | 3/1993 |
| GB | 2102092 | 1/1983 |

* cited by examiner

*Primary Examiner*—Robert J. Sandy
*Assistant Examiner*—David Reese
(74) *Attorney, Agent, or Firm*—Stephen R. Greiner

(57) ABSTRACT

A pop-up fastener including a tubular retainer for one-way passage into a socket. A fastening member slidably extends through the retainer. The fastening member has helical threads at its top and a protrusion at its bottom. A compressed spring is positioned atop the retainer for urging the protrusion into engagement with the bottom of the retainer and for urging the helical threads from the top of the retainer.

9 Claims, 2 Drawing Sheets

POP-UP FASTENER

FIELD OF THE INVENTION

The present invention relates generally to threaded fasteners and, more particularly, to such fasteners having resilient securing means.

BACKGROUND OF THE INVENTION

Air ducts used in commercial and residential construction are typically fabricated from thin metallic sheets that are cut and folded into shape. Such sheets are light in weight, easy to form, and inexpensive. However, when subjected to changes in temperature and pressure caused by air flowing through them, metallic ducts tend to expand and contract. Expansion and contraction of ductwork can be accompanied by unpleasant creaks and, over time, can lead to substantial leaks of air at joints between ducts. To limit ductwork movement, internal bracing is employed to reinforce most ducts of significant size.

Internal bracing is most often provided by extending rods, often referred to as "conduits," from the top to the bottom of a duct and from one side of a duct to another. Usually, the rods are outfitted with threaded sockets at their opposed ends that are aligned with small holes drilled in a duct. Bolts, extended through the holes into the sockets from the exteriors of ducts, secure the rods in place. The process of aligning the rods with the holes and tightening the fasteners is tedious, time-consuming, and requires two laborers to complete: one on the interior of the duct to move the rods about and the other on the exterior of the duct to position and tighten the threaded fasteners.

Some have proposed improvements to the standard bracing system. For example, we have for years offered to HVAC contractors rods with threaded studs extending from their opposite ends that one laborer can "snap-fit" into predrilled holes in ducts. After snap fitting, the same laborer can easily screw nuts onto the portions of the threaded studs extending outwardly through the holes in the ducts to secure the rods in place. Sadly, in the hands of unskilled individuals, the studs can sometimes snag on the interiors of ducts and crease ducts in an unsightly manner as the rods are being positioned. To overcome this problem, studs that retract into the ends of rods have been recently proposed. These retractable studs are complex in their construction and require special crimping tools for attachment to a rod in a time-consuming operation.

SUMMARY OF THE INVENTION

In light of the problems associated with the known threaded studs capable of retracting into a building element such as a rod used to reinforce an air duct, it is a principal object of the invention to provide a pop-up fastener of uncomplicated construction that can be easily and quickly installed in any close-fitting socket with conventional tools and with minimal instruction. The pop-up fastener constructed in accordance with the present invention appears to have utility aside from reinforcing ductwork such as assembling furniture, automobiles, and office equipment.

It is another object of the invention to provide a pop-up fastener in combination with a rod for reinforcing an air duct. The combination requires only one laborer to accomplish its installation and cannot, during ordinary installation efforts, damage metallic ductwork.

It is an object of the invention to provide improved elements and arrangements thereof in a pop-up fastener for the purposes described that is lightweight in construction, inexpensive to manufacture, and dependable in use.

Briefly, the pop-up fastener in accordance with this invention achieves the intended objects by featuring a retainer having a tubular sleeve with a longitudinal passageway. A wedge is fastened to the tubular sleeve and has a serrated rim with a number of outwardly and upwardly extending teeth. A fastening member slidably extends through the longitudinal passageway. The fastening member has helical threads at its top, a protrusion at its bottom, and an outwardly extending peripheral flange between the helical threads and the protrusion. A compressed spring is positioned atop the tubular sleeve for urging the protrusion into engagement with the bottom of the tubular sleeve and for urging the peripheral flange away from the top of the tubular sleeve.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
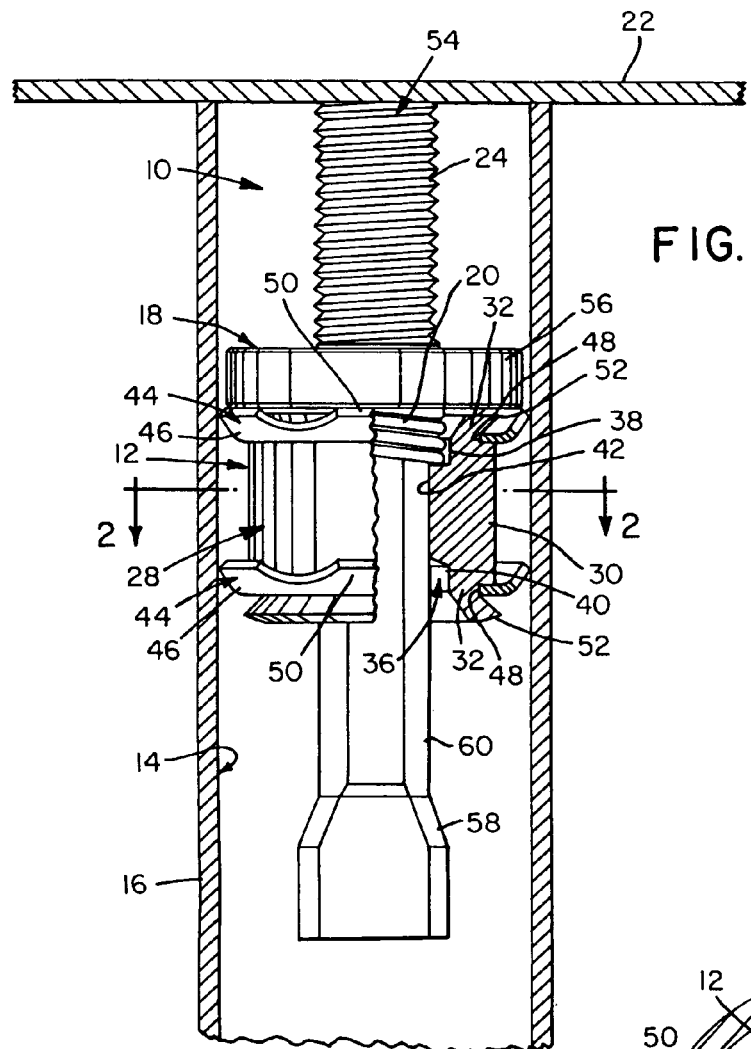
FIG. 1 is a partially cut-away side view of a pop-up fastener in accordance with the present invention shown in a compressed state inside the end of a conduit.

Referring now to the FIGS., a pop-up fastener in accordance with the present invention is shown at 10. Fastener 10 includes a retainer 12 adapted for one-way passage into a socket 14 in a first building element 16 and also includes a fastening member 18 slidably engaged with retainer 12. A compressed spring 20, wound about fastening member 18, urges fastening member 18 upwardly from retainer 12, outwardly from socket 14 and through a second building element 22 positioned adjacent first building element 16. Helical threads 24 at the top of fastening member 18 receive a washer 25 and nut 26 for releasably attaching building elements 16 and 22 together.

Retainer 12 includes a tubular sleeve 28 formed of metal and having a central portion 30 with a pair of end portions 32 extending from the top and bottom of central portion 30. Central portion 30 has a relatively large outer diameter and end portions 32 have relatively small outer diameters when tubular sleeve 28 is initially fabricated. Thus, a pair of shoulders 34 is provided to tubular sleeve 28 at the junctions of central portion 30 and end portions 32.

Figure 2:
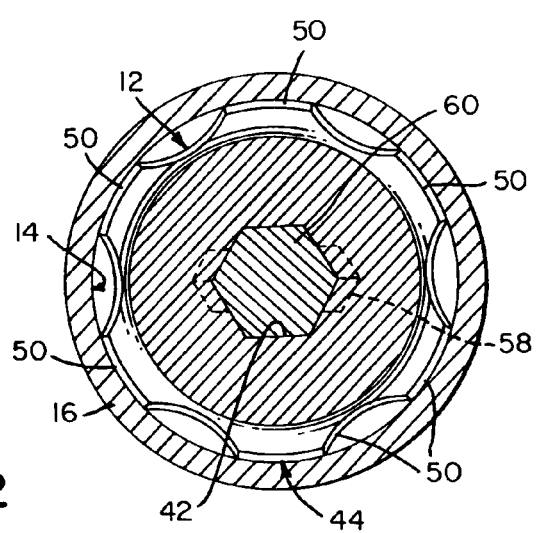
FIG. 2 is a cross-sectional view taken along line 2—2 of FIG. 1.

A longitudinal passageway 36 extends from the top to the bottom of sleeve 28. Passageway 36 includes relatively large diameter top and bottom segments 38 and 40 found substantially within end portions 32. Segments 38 and 40 are connected together by a constricted segment 42 found substantially within central portion 30 that snugly, yet slidably, grasps fastening member 18. Constricted segment 42 is hexagonal in cross section as is best seen in FIG. 2 but, as will become apparent upon further reading of this specification, such a cross-sectional configuration is largely a matter of design choice.

Seated on shoulders 34 is a pair of wedges 44 for gripping first building element 16. As shown, each wedge 44 comprises a bowl 46 having a central aperture 48 sized to snugly receive one of end portions 32. Each bowl 46 is formed of spring metal having a thickness that is less than the height of either of end portions 32. Furthermore, each bowl 46 has an undeformed outer diameter that is slightly greater than that of socket 14 so as to tightly engage building element 16 when pressed into socket 14. The rim of each bowl 46 is serrated so as to provide such with a plurality of outwardly and upwardly extending teeth 50 for enhanced gripping of building element 16.

Wedges 44 are secured to tubular sleeve 28 by bending end portions 32 against bowls 44. Such bending provides end portions 32 with overhanging rims 52 having outer diameters greater than those of apertures 48. As rims 52 cannot pass through apertures 48, wedges 44 cannot be withdrawn from tubular sleeve 28. Wedges 44 are, therefore, effectively anchored on shoulders 34.

Fastening member 18 includes an elongated rod 54 having an outwardly extending peripheral flange 56 proximate the midpoint of rod 54. The top of rod 54 is provided with helical threads 24. Additionally, the bottom of rod 54 is provided with a protrusion 58 having a size that is small enough to enter bottom segment 40 of passageway 36 but is too large to enter constricted segment 42. Protrusion 58 is formed by compressing opposite sides of rod 54 together under great force so as to permanently squeeze some material outwardly therefrom. Of course, protrusion 58 could be provided to rod 54 by the addition of material to the bottom of rod 54 through casting or welding or threadable fastening, all of these things being contemplated by the present invention.

Elongated rod 54 is provided with a keyed portion 60 between peripheral flange 56 and protrusion 58 that extends through passageway 36 of tubular sleeve 28. Keyed portion 60 has a hexagonal cross section of sufficient dimensions to freely slide up-and-down within constricted segment 42 of passageway 36. Furthermore, the hexagonal cross section has sufficient dimensions to prevent keyed portion 60 from rotating within constricted segment 42. Thus, when retainer 12 is firmly set within socket 14, fastening member 18 is free to slide up-and-down with respect to retainer 12 but cannot rotate with respect to retainer 12. The latter characteristic is particularly advantageous in preventing helical threads 24 from freewheeling when washer 25, with its rigid retaining disc 62 and sealing gasket 64, and nut 26 are tightened thereon.

It will be appreciated by those of ordinary skill in the mechanical arts that rod 54 and tubular sleeve 28 can be keyed together in a variety of ways to allow their relative sliding movement yet prevent their relative rotation. For example, both keyed portion 60 and constricted segment 42 can be provided with closely fitted polygonal cross sections having virtually any number of sides. Additionally, keyed portion 60 and constricted segment 42 can be provided with closely fitted cross sections of elliptical or ovoid form. Still further, keyed portion 60 and constricted segment 42 can be provided with closely fitted and irregularly shaped cross sections that are combinations of the previously noted shapes. The present invention, although showing closely fitted hexagonal cross sections for keyed portion 60 and constricted segment 42, contemplates the employment of all equivalent means for accomplishing the same ends addressed by keyed portion 60 and constricted segment 42.

Compressed spring 20 is disposed about keyed portion 60 of rod 54. As shown, the top of spring 20 presses against the bottom of peripheral flange 56 and the bottom of spring 20 presses against the top of tubular sleeve 28 to normally bias protrusion 58 into engagement with the bottom of tubular sleeve 28. To ensure that spring 20 stays axially aligned with keyed portion 60, the top of spring 20 is dimensioned to fit snugly within a circular recess 64 in the bottom of peripheral flange 56 and is similarly dimensioned to fit snugly within top segment 38 of passageway 36. Spring 20 is too large to extend into constricted segment 42 of passageway 36.

The use of pop-up fastener 10 is straightforward. First, the bottom of retainer 12 is inserted into socket 14 in building element 16. Next, the top of fastening member 18 is pressed downwardly so as to drive peripheral flange 56 into flush engagement with the top of tubular sleeve 28. By pressing downwardly on fastening member 18 against the opposing force of spring 20 until the top of fastening member 18 is flush with the top of building element 16, retainer 12 is forced into socket 14 as shown in FIG. 1 to its maximum working depth. Teeth 50, about the periphery of bowl-shaped wedges 44, snugly engage building element 16 and prevent retainer 12 from being withdrawn from socket 14.

Figure 3:
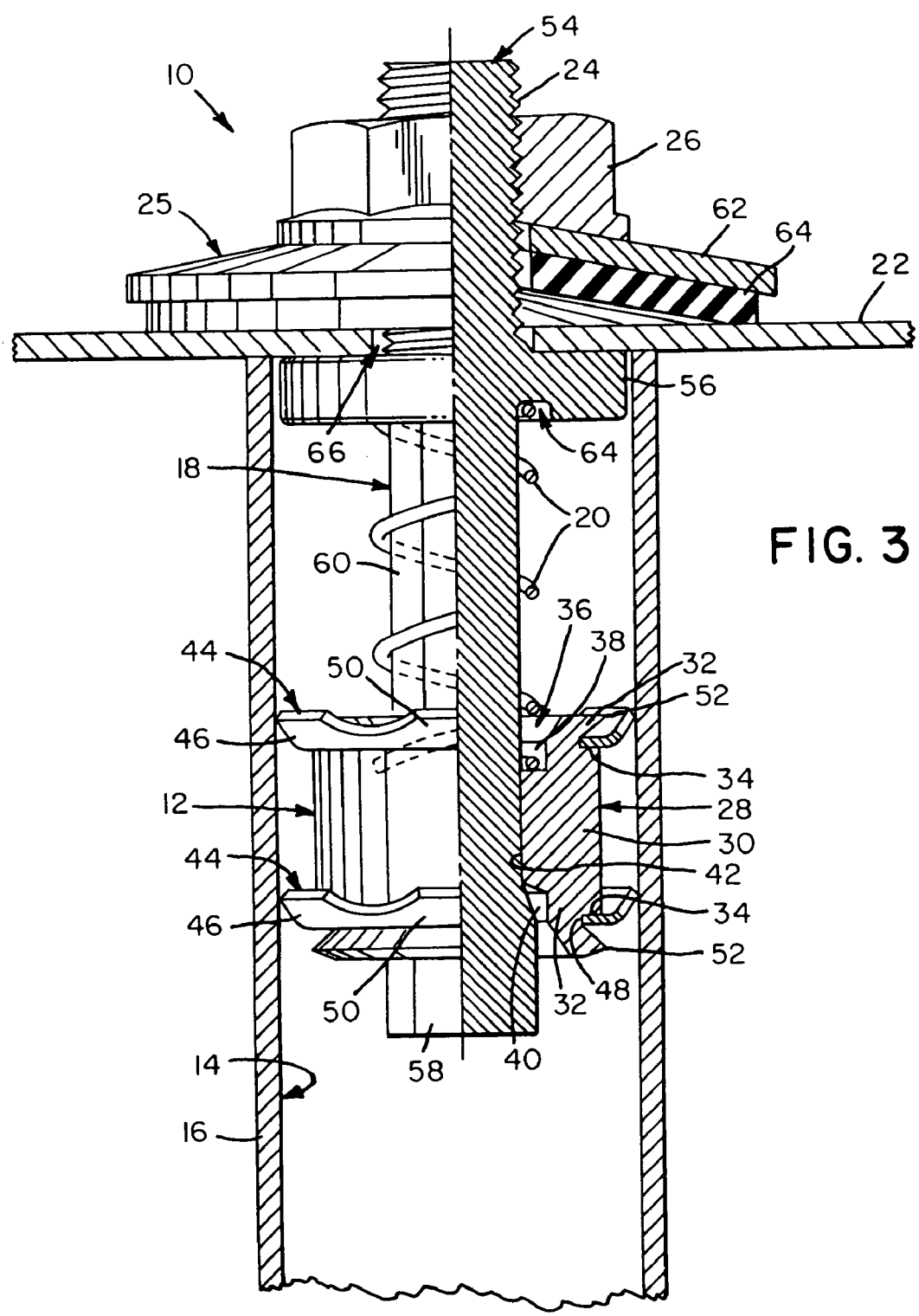
FIG. 3 is a partially cutaway side view of the pop-up fastener shown in a relaxed state with the top of the fastener extended through the sidewall of a duct.

When the downward force on fastening member 18 holding such fully within socket 14 is released, spring 20 elevates helical threads 24 on elongated rod 54 from socket 14 as shown in FIG. 3. Since the height of keyed portion 60 of rod 54 is substantially equal to the height of helical threads 24 plus the height of segments 38 and 42 of passageway 36, only helical threads 24 can extend from socket 14 when retainer 12 is at its maximum working depth. Protrusion 58 serves as a stop to further upward movement of helical threads 24 from socket 14.

FIG. 3 illustrates that when helical threads 24 are fully extended from socket 14, the top of peripheral flange 56 is positioned flush with the top of socket 14. Peripheral flange 56 not only serves to prevent debris from entering into socket 14 but, also, serves as an abutment surface against which nut 26 on helical threads 24 can clamp building element 22. To maximize the effectiveness of peripheral flange 56, it is preferred that peripheral flange 56 have a diameter that is both slightly less than that of wedges 44 and socket 14.

It is contemplated that building element 16 can be a hollow rod of the type used to internally reinforce an air-conditioning duct and that building element 18 can be a side wall of one of said ducts. In this case, the hollow rod is cut so that its opposite ends snugly engage the opposite side walls of the duct. The opposite ends of the hollow rod carry a pair of fasteners 10 with the helical threads 24 thereof being fully inserted into the hollow rod until fastening members 18 are axially aligned with holes as at 66 in the duct. Once axial alignment is achieved, helical threads 24 "pop-up" through the holes under the force of compressed springs 20. Washers 25 and nut 26 are subsequently employed in a conventional manner to secure the hollow rod within the duct. One unskilled laborer, working alone, can accomplish the task of reinforcing a duct with a single hollow rod in a few minutes with great savings over current methods and apparatus for performing the same task.

While the invention has been described with a high degree of particularity, it will be appreciated by those skilled in the art that modifications may be made thereto. For example, keyed portion 60 and constricted segment 42 can be provided with circular cross sections permitting the relative rotation of fastening member 18 and retainer 12, but such might result in a pop-up fastener that is less effective in receiving a nut 26. Therefore, it is to be understood that the present invention is not limited to the sole embodiment described above, but encompasses any and all embodiments within the scope of the following claims.

We claim:

1. A pop-up fastener, comprising:
   a tubular retainer being adapted for one-way passage into a socket;
   a fastening member slidably extending through said retainer, said fastening member having helical threads at its top and a protrusion at its bottom, and said fastening member also having an outwardly extending peripheral flange between said helical threads and said protrusion; and,
   a compressed spring being positioned atop said retainer, and being separated by said retainer from said protrusion, for urging said protrusion into engagement with the bottom of said retainer and for urging said helical threads away from the top of said retainer, said compressed spring being coiled about said fastening member, and said compressed spring also engaging the bottom of said outwardly extending peripheral flange and the top of said retainer.

2. The pop-up fastener according to claim 1 wherein said tubular retainer and said fastening member are keyed such that they cannot rotate relative to one another.

3. The pop-up fastener according to claim 1 wherein said tubular retainer comprises:
   a tubular sleeve having a longitudinal passageway slidably receiving said fastening member; and,
   a wedge fastened to said tubular sleeve, said wedge being a bowl with a serrated rim defining a plurality of outwardly and upwardly extending teeth.

4. The pop-up fastener according to claim 3 wherein said tubular retainer further comprises a pair of said wedges, one being fastened to the top of said tubular sleeve and other being fastened to the bottom of said tubular sleeve.

5. A pop-up fastener, comprising:
   a retainer including:
      a tubular sleeve having a longitudinal passageway; and,
      a wedge fastened to said tubular sleeve and having a serrated rim with a plurality of outwardly and upwardly extending teeth;
   a fastening member slidably extending through said longitudinal passageway of said tubular sleeve, said fastening member having helical threads at its top, a protrusion at its bottom, and an outwardly extending peripheral flange between said helical threads and said protrusion; and,
   a compressed spring being positioned atop said tubular sleeve for urging said protrusion into engagement with the bottom of said tubular sleeve and for urging said peripheral flange away from the top of said tubular sleeve.

6. The pop-up fastener according to claim 5 wherein said tubular sleeve and said fastening member are keyed such that they cannot rotate relative to one another.

7. The pop-up fastener according to claim 6 wherein said longitudinal passageway and said fastening member are provided with close-fitting polygonal cross sections.

8. The pop-up fastener according to claim 6 wherein said compressed spring is coiled about said fastening member and engages the bottom of said peripheral flange and the top of said tubular sleeve.

9. A pop-up fastener, comprising:
   a retainer including:
      a tubular sleeve having a central portion with a pair of end portions extending from the top and bottom thereof, said end portions having a relatively smaller diameter than that of said central portion so as to form a pair of shoulders at the junctions of said central portion and said end portions, and said tubular sleeve also having a longitudinal passageway with a constricted segment with a first polygonal cross section; and,
      a pair of wedges with each being positioned upon a respective one of said shoulders and secured there to the respective shoulder by bending said end portions outwardly, each of said wedges having a serrated rim with a plurality of outwardly and upwardly extending teeth;
   a fastening member slidably extending through said longitudinal passageway of said tubular sleeve, said fastening member having: a plurality of helical threads at the top thereof, a protrusion at the bottom thereof, and an outwardly extending peripheral flange positioned between said helical threads and said protrusion, and said fastening member having a keyed portion between said peripheral flange and said protrusion for slidable positioning within said constricted segment having a second polygonal cross section, said second polygonal cross section being incapable of turning within said first polygonal cross section; and,
   a compressed spring being coiled about said fastening member and engaging the bottom of said peripheral flange and the top of said tubular sleeve for urging said protrusion into engagement with the bottom of said tubular sleeve and for urging said peripheral flange away from the top of said tubular sleeve.

* * * * *